UNITED STATES PATENT OFFICE.

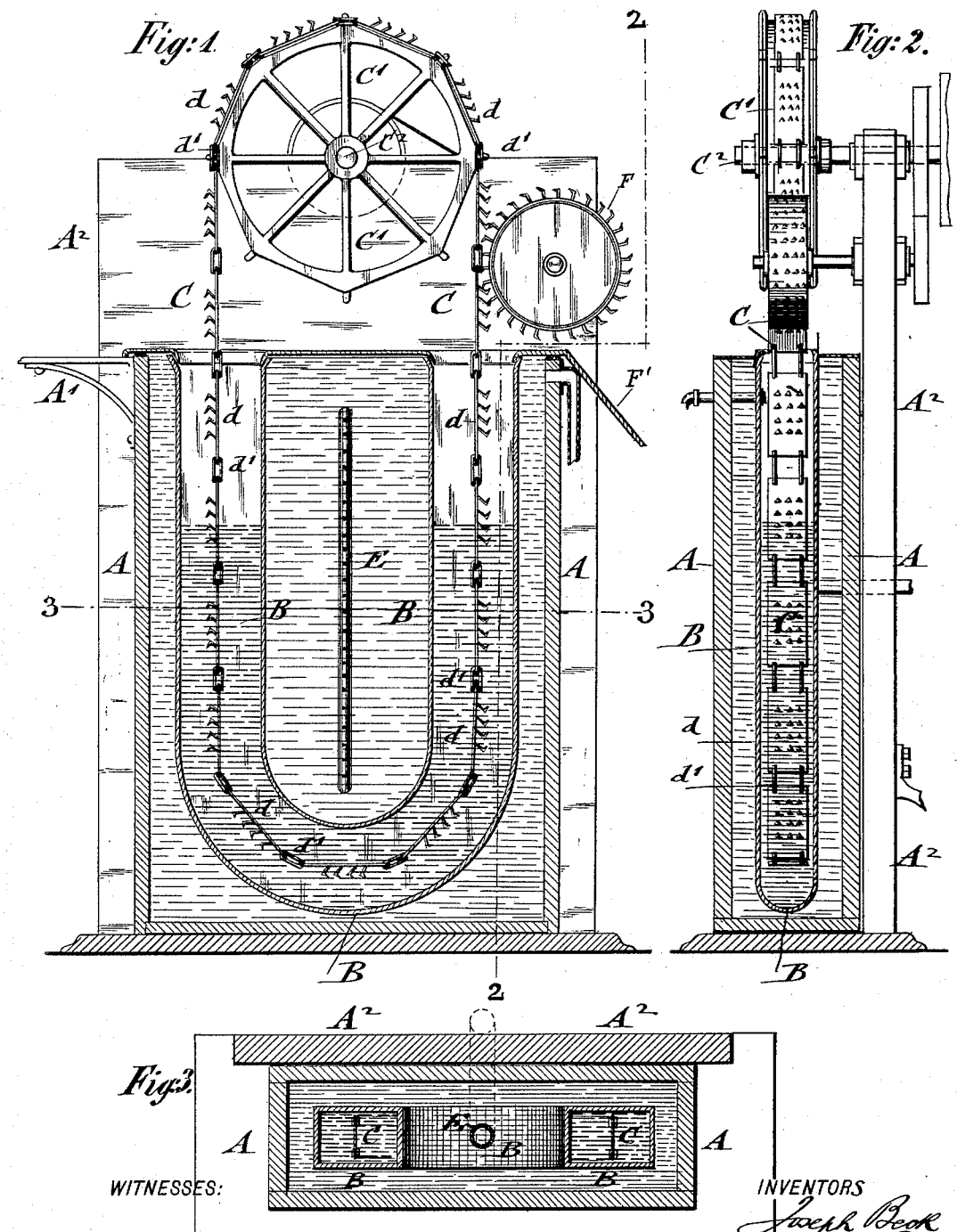

JOSEPH BECK, OF THOMASVILLE, NORTH CAROLINA, AND OSCAR A. NENNINGER, OF NEWARK, NEW JERSEY.

APPARATUS FOR MAKING GUN-COTTON.

SPECIFICATION forming part of Letters Patent No. 483,709, dated October 4, 1892.

Application filed June 28, 1892. Serial No. 438,251. (No model.)

*To all whom it may concern:*

Be it known that we, JOSEPH BECK, of Thomasville, Davidson county, North Carolina, and OSCAR A. NENNINGER, of Newark, Essex county, New Jersey, subjects of the Emperor of Germany, have invented certain new and useful Improvements in Apparatus for Making Gun-Cotton, of which the following is a specification.

This invention relates to an improved apparatus for making gun-cotton or collodion-cotton in a quick, effective, and continuous manner; and it consists of an apparatus for making gun-cotton, which comprises an exterior casing, an interior U-shaped acid-tank, an endless chain passing through the tank and being formed of link-plates having teeth for feeding the cotton to the acid in the tank, means for heating the tank, and a rotating toothed roller, which is located at the outgoing end of the tank and adapted to remove the nitrated cotton from the links of the chain, as will be fully described hereinafter, and finally pointed out in the claims.

In the accompanying drawings, Figure 1 represents a vertical transverse section of our improved machine for making gun-cotton. Fig. 2 is a vertical transverse section of the same on line 2 2 of Fig. 1; and Fig. 3 is a horizontal section on line 3 3, Fig. 1.

Similar letters of reference indicate corresponding parts.

Referring to the drawings, A represents an exterior casing or receptacle, which is preferably made of wood or other suitable material and which is provided at one end with a table A' for feeding the cotton to a U-shaped acid-tank B, which is suspended in the exterior casing A, the walls of said tank being preferably made of platinum, aluminum, or other metal that is capable of resisting the mixture of nitric and sulphuric acid in the same. The U-shaped acid-tank is open at the top, so that an endless chain C for taking up and feeding the cotton can be readily passed through the same, said chain being formed of plates $d$, having teeth that are punched up from the plates, and links $d'$ for connecting said plates. The endless chain C is loosely suspended from a sprocket-wheel C', that is applied to a shaft to which a slow motion is imparted by suitable belt-and-pulley transmission. The shaft $C^2$, by which motion is imparted to the sprocket-wheel C', is supported in bearings at the upper end of an upright wall or standard $A^2$, that is attached to the receptacle A and attached to the base of the apparatus. The toothed plates $d$ and the connecting-links $d'$ of the endless chain C are, like the tank B, made of platinum, aluminum, or other acid-resisting metal. In the space between the legs of the U-shaped acid-tank D is arranged a steam jet-pipe E, by which steam is supplied to the water in the receptacle, so that the water surrounding the acid-tank, and thereby the acid in the tank, is kept at a uniform temperature. The cotton, which is placed on the table at the ingoing end, is fed slowly to the tank by the toothed plates of the endless chain C and moved through the tank until it is removed by a toothed roller F, that is arranged above the outgoing end of the tank and dropped on an inclined plate F', from which the nitrated cotton is conducted off for further treatment. The shaft of the toothed roller F is supported in bearings of the standard $A^2$ and rotated by a belt-and-pulley transmission from the shaft of the sprocket-wheel C'. It receives a quicker motion than the endless chain C, so that the teeth of the roller remove the nitrated cotton from the toothed plates and drop it onto the inclined delivery-plate F'. The acid-tank B is charged with a mixture of nitric and sulphuric acid in the proportion ordinarily employed for nitrating cotton. The water bath surrounding the tank keeps the acid at a uniform temperature, while the cotton is slowly taken up from the table $A^2$ by the toothed plates of the endless chain and drawn by the latter through the acid in the tank, so that all the fibers in the same are thoroughly saturated and acted on by the acid while they are moved by the chain first in downward direction in one leg of the tank, then around the curved lower part of the same, and then in upward direction in the second leg of the same until the nitrated cotton is removed by the toothed roller F. By the uniform immersion of the cotton into the acid and the considerable length of time during which the same remains in the acid mixture until it is removed from the endless chain the effective change of the cotton into collodion-cotton is produced, while by the continuous working of the apparatus a considerable saving in time and labor and a large increase in the productive capacity of the apparatus is obtained.

Having thus described our invention, what we claim as new, and desire to secure by Letters Patent, is—

1. An apparatus for making collodion-cotton, which consists of a U-shaped acid-tank, a water bath for said tank, an endless chain formed of toothed plates and connecting-links, said chain passing through the tank, and a toothed roller at the outgoing end of the tank for removing the nitrated cotton, substantially as set forth.

2. An apparatus for making collodion-cotton, composed of a U-shaped acid-tank, a water bath surrounding the same, means for heating the water bath, an endless chain composed of toothed plates and connecting-links, passing through the tank, a sprocket-wheel for moving the endless chain through the tank, and a toothed roller located at the outgoing end of the tank for removing the nitrated cotton from the plates of the chain, substantially as set forth.

3. An apparatus for making collodion-cotton, composed of a U-shaped acid-tank, a water bath in which the acid-tank is suspended, means for heating the water bath, an endless chain formed of toothed plates and connecting-links, a sprocket-wheel for moving the endless chain through the acid-tank, a table for feeding the cotton to the ingoing end of the acid-tank, an inclined discharge-plate at the outgoing end of the tank, and a rotating toothed roller adapted to remove the nitrated cotton from the toothed plates of the chain, substantially as set forth.

In testimony that we claim the foregoing as our invention we have signed our names in presence of two subscribing witnesses.

JOS. BECK.
OSCAR A. NENNINGER.

Witnesses as to the signature of Jos. Beck:
MATTHEW P. TAYLOR, Sr.,
ROBT. F. NENNINGER.

Witnesses as to the signature of Oscar A. Nenninger:
PAUL GOEPEL,
CHARLES SCHROEDER.